(12) United States Patent
Botarelli

(10) Patent No.: US 8,448,445 B2
(45) Date of Patent: May 28, 2013

(54) METHOD FOR THE START-UP OF A GAS TURBINE

(75) Inventor: Claudio Botarelli, Arezzo (IT)

(73) Assignee: Nuovo Pignone S.p.A., Florence (IT)

( * ) Notice: Subject to any disclaimer, the term of this patent is extended or adjusted under 35 U.S.C. 154(b) by 324 days.

(21) Appl. No.: 12/364,580

(22) Filed: Feb. 3, 2009

(65) Prior Publication Data

US 2010/0126179 A1 May 27, 2010

(30) Foreign Application Priority Data

Feb. 4, 2008 (IT) .............................. MI2008A0164

(51) Int. Cl.
*F02C 7/22* (2006.01)
*F02C 7/26* (2006.01)

(52) U.S. Cl.
USPC .............. 60/778; 60/776; 60/39.281; 60/786; 60/790; 60/39.094

(58) Field of Classification Search
USPC .......... 60/778, 776, 39.281, 786, 790, 39.094
See application file for complete search history.

(56) References Cited

U.S. PATENT DOCUMENTS

| | | | |
|---|---|---|---|
| 5,274,996 A * | 1/1994 | Goff et al. .................. | 60/790 |
| 6,062,016 A | 5/2000 | Edelman | |
| 2007/0113560 A1* | 5/2007 | Steber et al. ................ | 60/773 |
| 2007/0245745 A1* | 10/2007 | Davies et al. ................ | 60/778 |

FOREIGN PATENT DOCUMENTS

| | | |
|---|---|---|
| CN | 1133421 A | 10/1996 |
| CN | 1170814 A | 1/1998 |
| CN | 1858422 A | 11/2006 |
| DE | 10226721 A1 | 1/2004 |
| EP | 1860302 A | 11/2007 |
| WO | 03014551 A | 2/2003 |
| WO | 2007/134886 A1 | 11/2007 |

OTHER PUBLICATIONS

European Search Report issued in connection with corresponding EP Patent Application No. 09151772 on May 29, 2009.
Zheng, Baoshan et al.: "Quality Measuring in On-Line Process Analysis", First Edition, Hydrocarbon Process Press: p. 369-370 with English translation.
Unofficial English translation of CN Office Action dated Dec. 11, 2012 from corresponding CN Application No. 200910005788.4.

* cited by examiner

*Primary Examiner* — Phutthiwat Wongwian
*Assistant Examiner* — Craig Kim
(74) *Attorney, Agent, or Firm* — GE Global Patent Operation

(57) ABSTRACT

A method is described for the start-up of a gas turbine comprising the phases of effecting a preliminary purging cycle of the discharge duct (28) of the turbine (20), establishing a predetermined minimum value ($FSR_1$) for the flow of gaseous fuel entering the combustor (14) for a period of time which is adequate for effecting a first attempt at ignition and effecting a first attempt at ignition, effecting an intermediate purging cycle of the discharge duct (28), interrupting the flow of gaseous fuel to the combustor (14), and progressively increasing the value ($FSR_n$) of the flow of gaseous fuel entering the combustor (14), effecting further attempts at ignition until the mixture of air/gaseous fuel has been ignited and the consequent start-up of the turbine (20), or until a predetermined maximum value ($FSR_{max}$) of the flow of gaseous fuel has been reached.

7 Claims, 5 Drawing Sheets

Fuel gas pressure

Fuel gas flow-rate through primary nozzles

Verification of the postion of the control valve 1 of the fuel gas

Verification of the postion of the pressure regulation valve of the fuel gas

METHOD FOR THE START-UP OF A GAS TURBINE

The present invention relates to a method for the start-up of a gas turbine.

In numerous industrial applications, such as for example in the production of electric energy, the use is known of gas turbines, normally consisting of a multiphase compressor, in which air sucked from the outside is compressed, a combustor, in which the combustion takes place of gaseous fuel added to the compressed air, and a turbine or expander, in which the gases coming from the combustor are expanded. The turbine is therefore capable of generating mechanical energy which can be exploited for driving operating machines or for charging electric generators.

As is known, the start-up or activation phase of a gas turbine is a relatively complex operation. Before a gas turbine can operate at full regime, it is normally necessary to bring the compressor to a rotation rate which is sufficient for providing a certain compression ratio. This operation is generally effected by means of a boost engine.

At the above rotation rate, the compressor must be capable of supplying a sufficient air flow-rate for igniting a flame at minimum regime in the combustor, this functioning condition being known in technical jargon as "light off". In practice, the light off condition is verified when the rotation rate of the compressor is selected so that flow conditions are established in the combustion chamber which are such as to facilitate the ignition of the fuel gas and stabilize the flame generated. The flow-rate of fuel gas is selected as a consequence.

Once the machine has reached a self-sustaining condition or, in other words, a condition in which the turbine is capable of producing enough power to entrain the compressor, the boost engine can be disinserted and the flow-rate of fuel increased, until the machine has reached its regime rate.

A gas turbine is typically capable of operating with different mixtures of fuel gas having different heat values. As the variation range of the Wobbe indexes relating to the different gaseous fuels used is normally relatively wide, there can be different light off conditions for the same turbine depending on the various fuels adopted. As is known, the Wobbe index measures the ratio between the lower heat value (or upper) of a gas and the square root of the relative density of the gas, measured with respect to the air:

$$I_w = PC/\sqrt{T_G \cdot G_S}$$

wherein:
$I_W$=Wobbe index of a certain gas;
PC=heat value (lower or upper) of the gas;
$T_G$=temperature of the gas;
$G_S$=relative density (or specific gravity) of the gas.

It should be pointed out that what is indicated in the above formula is called "modified Wobbe index", to distinguish it from the actual Wobbe index which does not include the correction with the temperature of the fuel gas mixture.

The start-up phase of a turbine effected using a gaseous fuel with characteristics not specifically determined and/or with uncertainties in estimating the flow-rate of air that can be supplied by the compressor, i.e. with air/fuel ratios not perfectly calibrated, can cause various problems, among which the following can be mentioned:
ignition failure of the turbine due to the difficulty in controlling the flammability conditions of the air/fuel mixture in the combustion chamber;
damage to the mechanical parts of the turbine and/or problems for the safety of the operators, due to the possibility, even if remote, of explosions inside the motor and/or of the discharge ducts as a result of the heat produced in the ignition phase.

So far, the only possibility of achieving an effective and safe start-up of a turbine involved the necessity of using fuels with well-known characteristics or a reduction, within extremely limited ranges, in the variation in the air/fuel ratio in the mixture. A known method for the start-up of a gas turbine is described for example in U.S. Pat. No. 6,062,016.

A general objective of the present invention is therefore to provide a method which allows the effective and safe start-up of a gas turbine, which overcomes the above-mentioned problems of the known art.

In particular, an objective of the present invention is to provide a method for the start-up of a gas turbine in which it is always possible to obtain an effective ignition also in the case of a variation in the air/fuel ratio in the mixture.

Another objective of the invention is to provide a method for the start-up of a gas turbine capable of maintaining the average air/fuel ratio in the mixture below the flammability limits, facilitating the isolation, on the part of the safety devices installed on the machine, of possible small quantities of flammable mixture in the flame extinguishing areas present in the discharge ducts of the machine itself.

These objectives according to the present invention are achieved by providing a method for the start-up of a gas turbine as specified in claim 1.

Further characteristics of the invention are indicated in the dependent claims, which are an integrant part of the present description.

The characteristics and advantages of a method for the start-up of a gas turbine effected according to the present invention will appear more evident from the following illustrative and non-limiting description, referring to the enclosed schematic drawings, in which.

Figure 1:
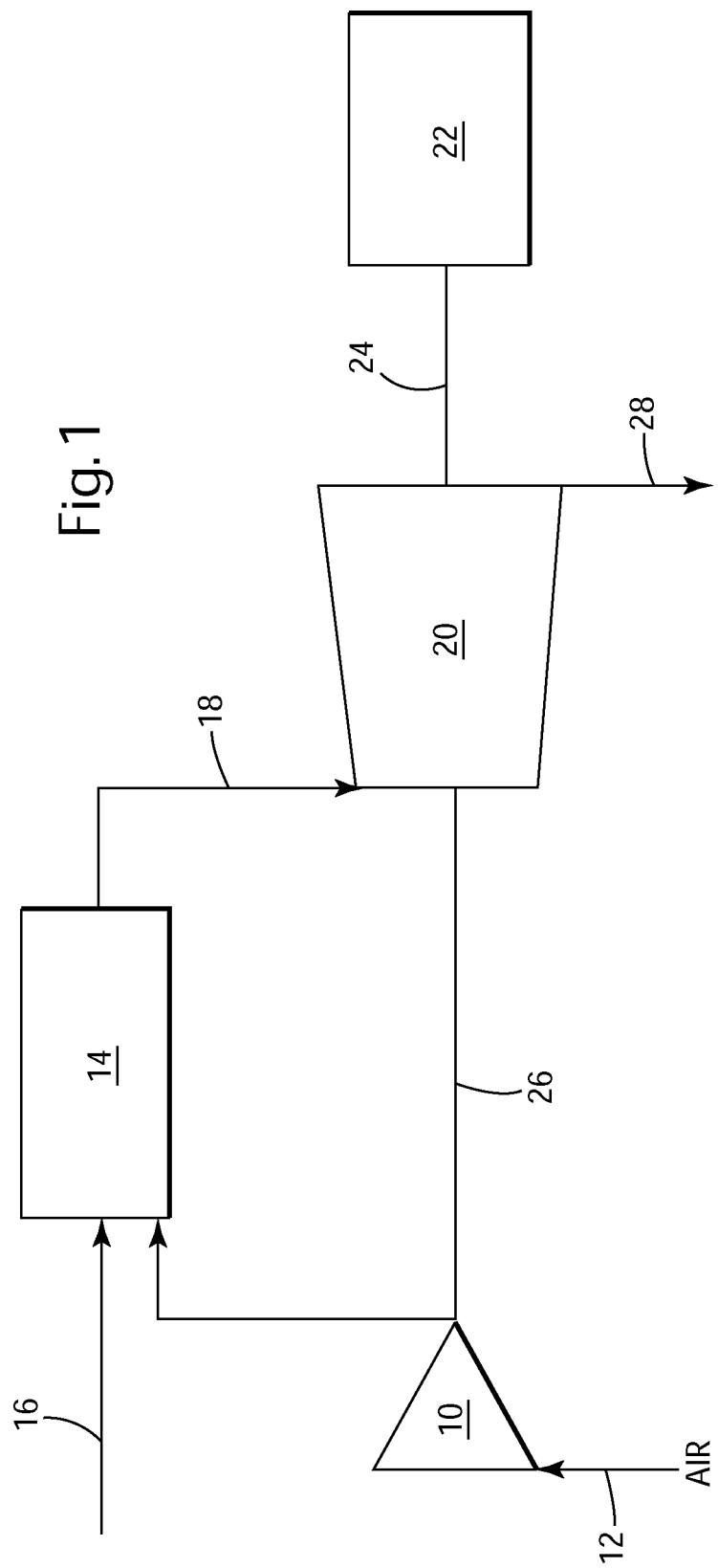
FIG. 1 is a schematic illustration of a gas turbine to which a method for the start-up according to the present invention can be applied.

With reference in particular to FIG. 1, this schematically shows a generic gas turbine, comprising a compressor 10 capable of compressing air introduced through an inlet duct 12. The compressed air is then sent to a combustor 14 to be mixed with a gaseous fuel, selected from a series of gaseous fuels having different Wobbe indexes, coming from a feeding duct 16. The combustion raises the temperature, the rate and flow volume of gas and consequently the energy contained therein. Said flow of combusted gas is directed, through a duct 18, towards a turbine 20, which transforms the energy into work energy which can be exploited for activating operating machines, such as for example, a generator 22 connected to the turbine 20 itself by means of a shaft 24. The turbine 20 also supplies the necessary energy for activating the compressor 10 through the relative shaft 26, whereas the discharge gases are expelled from the turbine 20 through an outlet duct 28.

According to the invention, the method for the start-up of a gas turbine comprises first of all a preliminary purging cycle of the discharge duct 28, to be effected while the turbine 20 is rotating at the purging rate. As is known, "purging" refers to the periodical cleaning operation of the feeding ducts of the gaseous fuel when the relative burner line is not in use. At the end of the purging phase, the light off phase is effected, and the flow of gaseous fuel at the inlet of the combustor 14 is set at a first predetermined minimum value $FSR_1$, which is sufficient for igniting the richest air/fuel mixture among those which can be obtained with the different gaseous fuels, for a period of time which is adequate for filling the feeding duct 16 and effecting a first attempt at ignition, according to the known procedures in a generic gas turbine.

At this point, if the ignition of the mixture has not taken place, an intermediate purging cycle of the discharge duct 28 is effected, interrupting the flow of fuel to the combustor 14. The flow of gaseous fuel entering the combustor 14 is then set at a second predetermined value $FSR_2$, higher than the first predetermined minimum value $FSR_1$ and maintained for a sufficient time for effecting a further brief attempt at igniting the air/fuel mixture. In the case of ignition failure, a further purging cycle of the discharge duct 28 will be effected.

The sequence indicated above is repeated, with successive increases in the $FSR_n$ value of the flow of gaseous fuel, until the ignition of the air/fuel mixture has been effected, or until a predetermined maximum value $FSR_{max}$ of said fuel flow has been reached. If this last hypothesis is verified, i.e. if, in the meantime, it has not been possible to activate the turbine 20, a final purging cycle must be effected, after the turbine 20 has been brought to a particularly reduced predefined rotation regime (defined in technical jargon as "crank speed"), before stopping the machine and possibly restarting with the sequence of ignition phases.

Figure 2:
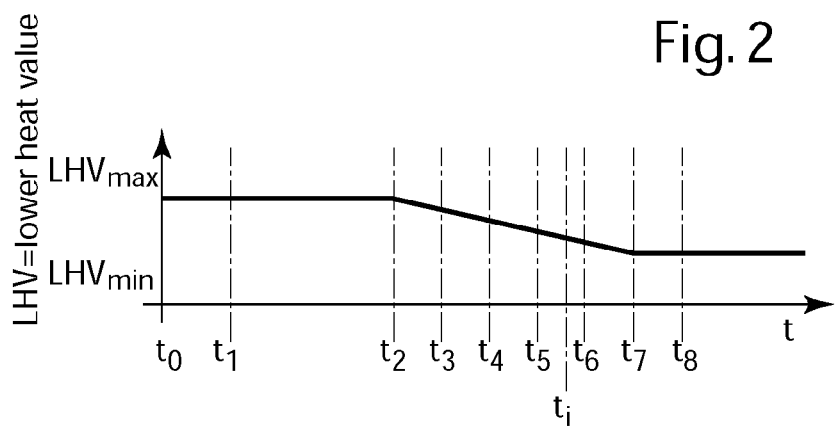
FIG. 2 is a diagram which shows the variation, in relation to the time, in the hypothetical lower heat value of a certain gaseous fuel used in the turbine of FIG. 1.

More specifically, with reference to FIGS. 2 to 5, these show an illustrative ignition sequence of a turbine, using the method according to the present invention. In the diagram of FIG. 2, LHV indicates the lower heat value of a certain gaseous fuel used in the turbine. The lower heat value LHV varies from a maximum value $LHV_{max}$ to a minimum value $LHV_{min}$, wherein $LHV_{max}$ corresponds to the lower heat value of the richest gaseous fuel among those used. The minimum value $LHV_{min}$, on the other hand, is calculated as the maximum value between the lower heat value measured by the instrumentation of the turbine, for example by means of a calorimeter, and the minimum value of the lower heat value of the poorest gaseous fuel considered safe during the start-up of the turbine. If there is no device available for measuring or estimating the heat value of the gas, the $LHV_{calorimeter}$ value can be considered zero. In practice:

$LHV_{min}=Max(LHV_{calorimeter}, LHV_{poor\,gas})$

Figure 3:
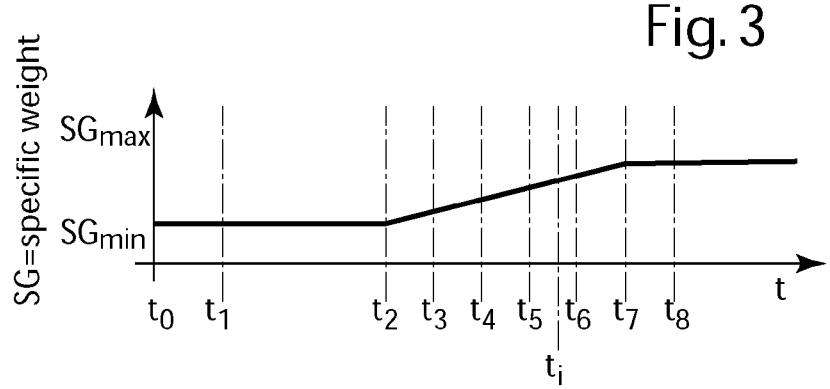
FIG. 3 is a diagram which shows the variation, in relation to the time, in the hypothetical specific weight of a certain gaseous fuel used in the turbine of FIG. 1.

In the diagram of FIG. 3, SG indicates the specific weight of a certain gaseous fuel used in the turbine. Analogously to what is specified above, the specific weight value SG varies from a maximum value $SG_{max}$ to a minimum value $SG_{min}$, wherein $SG_{min}$ corresponds to the specific weight of the richest gaseous fuel among those used. The maximum value $SG_{max}$, on the other hand, is calculated as the minimum value of the specific weight of the gaseous fuel considered safe during the start-up of the turbine, and is equal to:

$SG_{max}=Min(SG_{calorimeter}, SG_{poor\,gas})$

As in the case of the lower heat value LHV, if there is no device available for measuring or estimating the specific weight SG, the $SG_{calorimeter}$ value can be considered zero.

Figure 4:
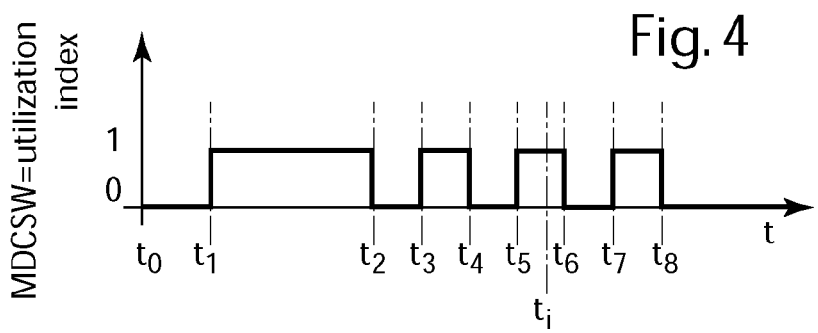
FIG. 4 is a diagram which shows the utilization index of the turbine of FIG. 1 in the various application phases of the start-up method according to the present invention.
Figure 5:
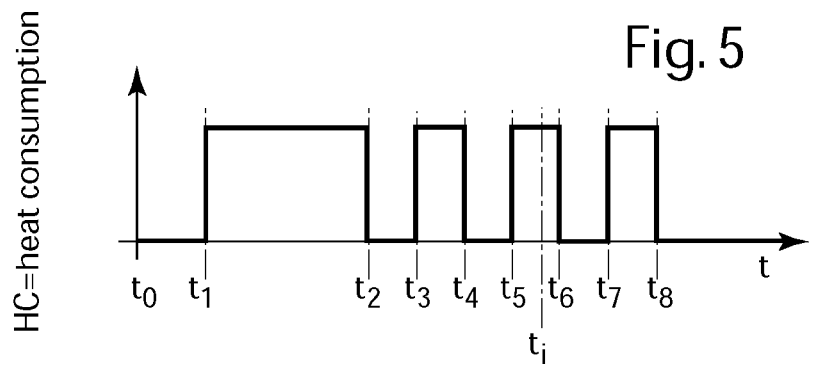
FIG. 5 is a diagram which shows the heat consumption under the light off conditions in the various application phases of the start-up method of a turbine according to the present invention.
Figure 6:
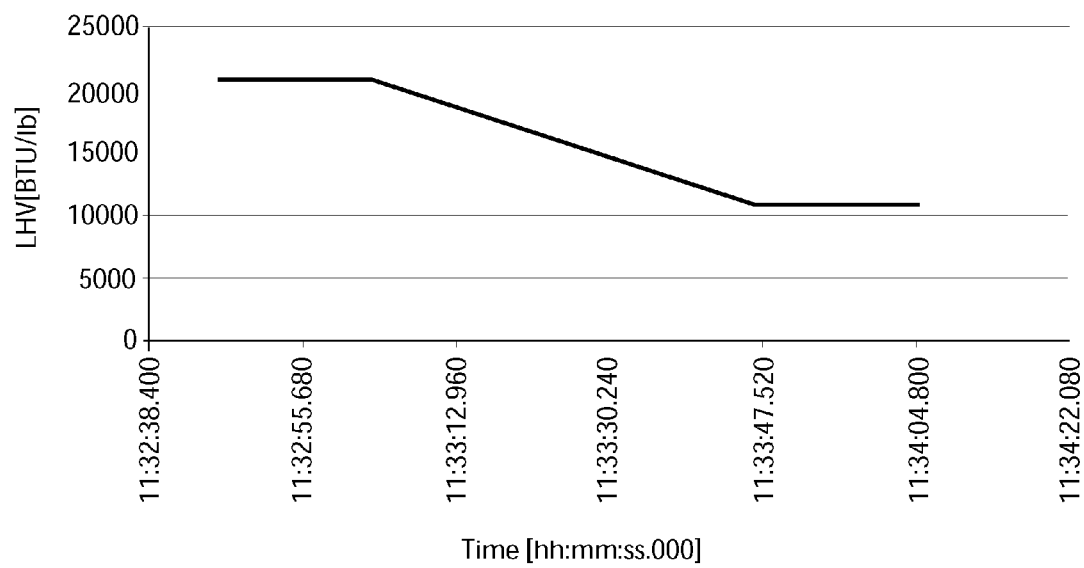
FIGS. 6 to 10 indicate some experimental parameters, measured in relation to the time, which show the validity of the method for the start-up of a turbine according to the present invention.
Figure 7:
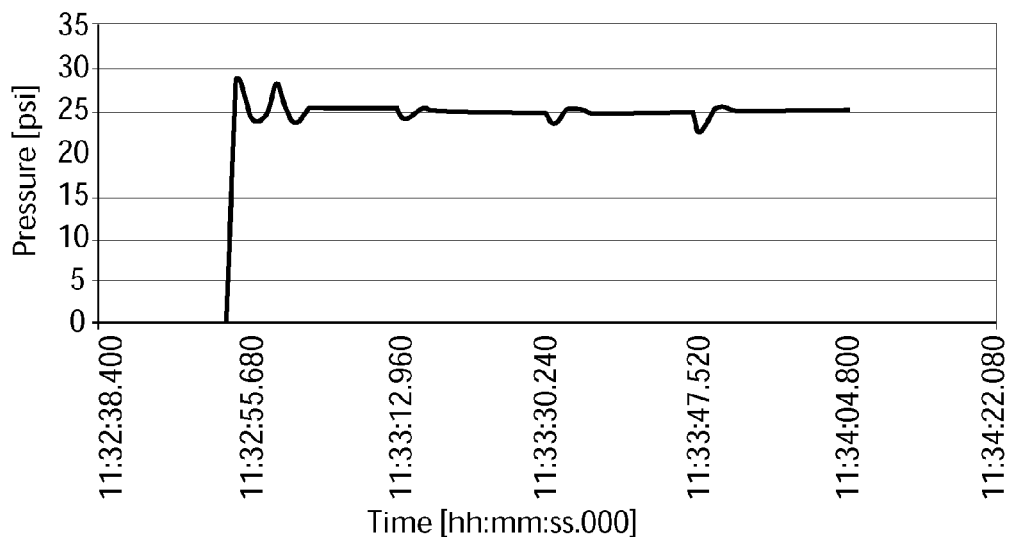
Figure 8:
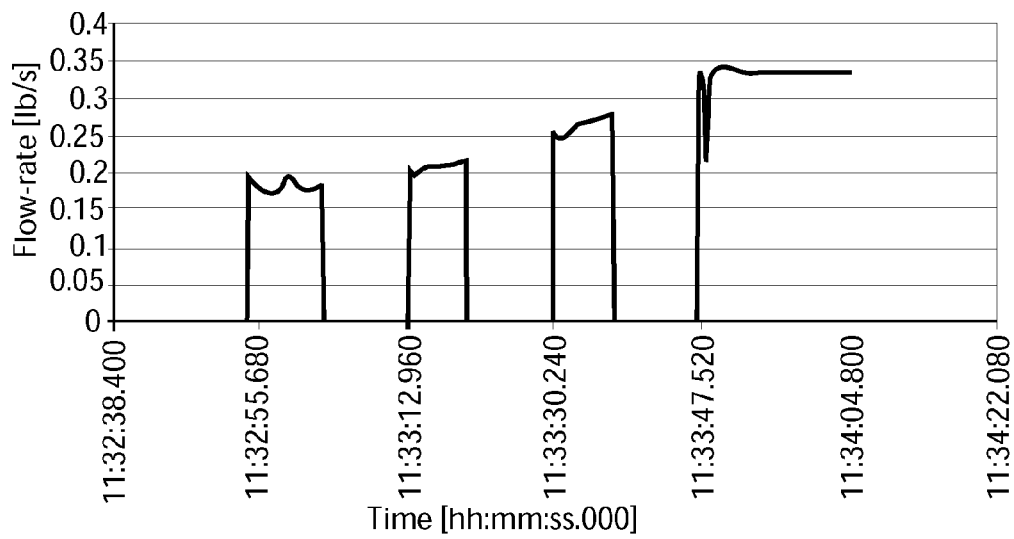
Figure 9:
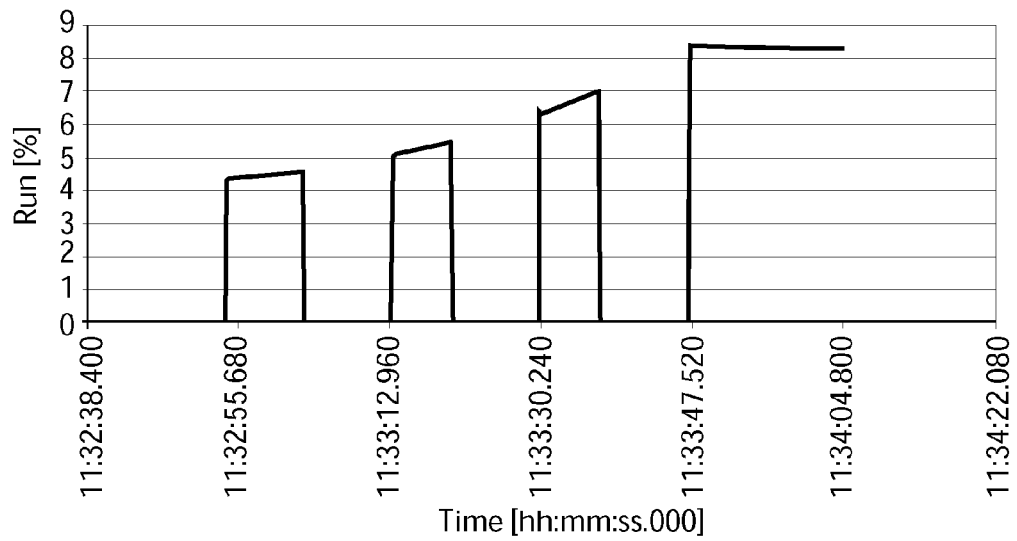
Figure 10:
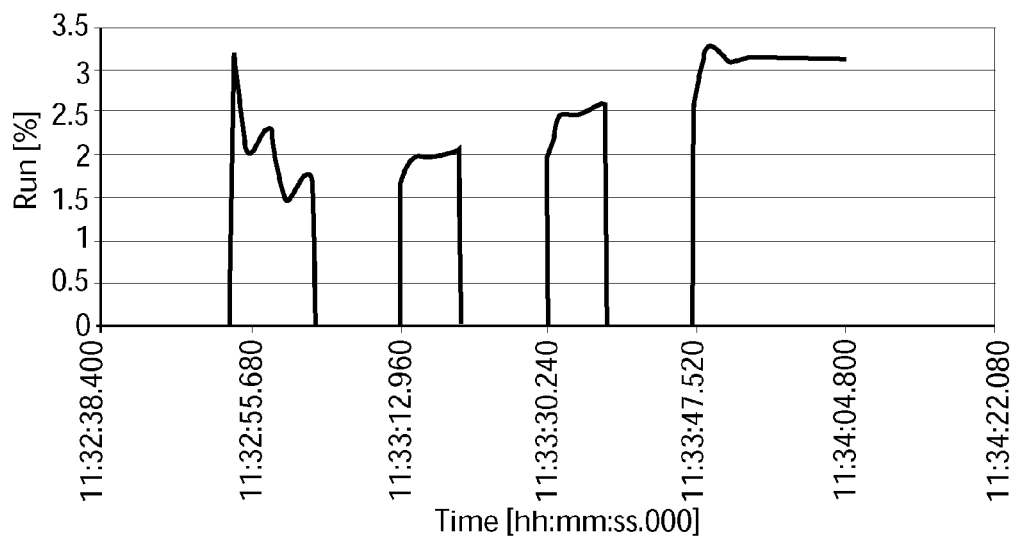

FIG. 5 shows the reference heat consumption under light off conditions, correlated to the utilization index MDCSW of FIG. 4. In this figure, when MDCSW=1 the ignition system is activated, whereas when MDCSW=0 the ignition system is deactivated.

In consideration of this, the typical start-up phases of a gas turbine, in relation to the time $t_i$ and with reference to FIGS. 2 to 5, can be summarized as follows:

Time $t_0$:
the preliminary purging phase of the discharge duct 28 is completed. The turbine is brought to the light off rotation rate. In this phase:
MDSCW=0
$LHV=LHV_{max}$
$SG=SG_{min}$ Time $t_1$:
the turbine is at the light off rotation rate, the ignition system is activated and the safety vents are opened. In this phase:
MDSCW=1
$LHV=LHV_{max}$
$SG=SG_{min}$ Time $t_2$:
ignition has not taken place. An intermediate purging phase of the discharge duct 28 is effected. The ignition system is deactivated and the safety vents are closed. In this phase:
MDSCW=0
LHV=LHV decreases
SG=SG increases Time $t_3$:
the intermediate purging phase of the discharge duct 28 is stopped. The feeding of gaseous fuel is restarted, the ignition system is activated and the safety vents are opened. In this phase:
MDSCW=1
LHV=LHV decreases
SG=SG increases Time $t_4$:
ignition has failed. A new intermediate purging phase of the discharge duct 28 is effected. The ignition system is deactivated and the safety vents are closed. In this phase:
MDSCW=0
LHV=LHV decreases
SG=SG increases If, at any given time $t_8$, the start-up of the turbine has not taken place, the light off sequence is terminated. A complete purging phase of the machine is therefore effected before its complete stoppage.

Assuming, on the other hand, that at a certain time the air/fuel mixture is ignited, the heating phase of the turbine can be started. The current lower heat values LHV and specific weight values SG of the gas are established by the control logics of the machine as values for the start-up sequence. The light off sequence is terminated and the machine is ready for heating and subsequent acceleration until the functioning rate at full regime is reached.

FIGS. 6 to 10 illustrate various experimental parameters, measured in relation to the time, obtained during a "blank" start-up test of a gas turbine in operation. Using a particularly rich gaseous fuel, it was observed that ignition was verified in the initial phases of the light off sequence whereas with a poor fuel ignition only took place in the final phases, but always fully respecting the desired safety conditions.

It can thus be seen that the method for the start-up of a gas turbine according to the present invention achieves the objectives previously specified, obtaining the following advantages:

possibility of activating the turbine with different compositions of gaseous fuels;

effective and safe start-up sequence;

fewer requisites, with respect to the applications of the known type, that the compositions of gaseous fuels must have for effecting the start-up of the turbine.

The method for the start-up of a gas turbine of the present invention thus conceived can in any case undergo numerous modifications and variants, all included in the same inventive concept. The protection scope of the invention is therefore defined by the enclosed claims.

What is claimed is:

1. A method for the start-up of a gas turbine of the type having at least one compressor, which compresses the air introduced therein through an inlet duct, at least one combustor, in which said compressed air is mixed and combusted with a gaseous fuel, coming from a feeding duct, and at least one turbine, which transforms the energy of the combusted gas coming from said combustor into work energy, the method comprising the following phases:
   a) establishing a predetermined minimum value ($FSR_1$) of the fuel flow entering said combustor and effecting a first attempt at ignition, wherein the predetermined minimum value is established by being set at a value that is sufficient to ignite a richest fuel/air mixture among a predetermined group of gaseous fuels; and
   b) progressively increasing the value ($FSR_n$) of the fuel flow entering said combustor and effecting further attempts at ignition until the complete ignition of the air/fuel mixture and consequent start-up of said turbine, or until a predetermined maximum value ($FSR_{max}$) of said fuel flow is reached, wherein in said phase b) an intermediate purging cycle of said discharge duct is effected, interrupting the flow of gaseous fuel to said combustor before the increase in said value ($FSR_n$) of the fuel flow.

2. The method according to claim 1, wherein before said first phase a) a preliminary purging cycle of the discharge duct of said turbine is effected.

3. The method according to claim 2, wherein said preliminary purging cycle is effected while said turbine is rotating in particular at the purging rate or at the light off rate.

4. The method according to claim 1, wherein after phase b), a final purging cycle of said turbine is effected, in the case of ignition failure of the air/fuel mixture when said predetermined maximum value ($FSR_{max}$) of the fuel flow has been reached, to be effected after said turbine has been brought to predefined rotation regime and before stopping said turbine to restart with the sequence of ignition phases.

5. The method according to claim 1, also comprising purging cycles with said turbine in rotation.

6. The method according to claim 1, wherein said gaseous fuel is selected from a plurality of gaseous fuels having different Wobbe indexes.

7. The method according to claim 6, wherein said predetermined minimum value ($FSR_1$) of the flow of gaseous fuel entering said combustor is sufficient for igniting the richest air/fuel mixture among those obtainable with said plurality of gaseous fuels having different Wobbe indexes.

* * * * *